United States Patent
Wu et al.

(10) Patent No.: US 12,382,413 B2
(45) Date of Patent: Aug. 5, 2025

(54) COMMUNICATION SYSTEM AND COMMUNICATION METHOD

(71) Applicant: Industrial Technology Research Institute, Hsinchu (TW)

(72) Inventors: Chiu-Ping Wu, Hsinchu County (TW); Hsin-An Hou, New Taipei (TW); Jen-Yuan Hsu, Kinmen County (TW); Chun-Nan Liu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 461 days.

(21) Appl. No.: 18/089,592

(22) Filed: Dec. 28, 2022

(65) Prior Publication Data
US 2024/0179653 A1 May 30, 2024

(30) Foreign Application Priority Data
Nov. 30, 2022 (TW) .................. 111145822

(51) Int. Cl.
*H04W 56/00* (2009.01)
(52) U.S. Cl.
CPC ..... *H04W 56/0045* (2013.01); *H04W 56/001* (2013.01)
(58) Field of Classification Search
CPC .......... H04W 56/0045; H04W 56/001; H04W 56/00; H04W 8/08; H04W 4/023; H04L 43/0852; H04L 43/087; H04L 49/9084
See application file for complete search history.

(56) References Cited

U.S. PATENT DOCUMENTS

| | | | |
|---|---|---|---|
| 9,596,001 B2 | 3/2017 | Gerszberg et al. | |
| 2004/0008646 A1 | 1/2004 | Park et al. | |
| 2015/0236781 A1 | 8/2015 | Jalali | |
| 2021/0119861 A1 | 4/2021 | Tripathi et al. | |
| 2021/0367696 A1 | 11/2021 | Lin et al. | |
| 2022/0158897 A1 | 5/2022 | Chou et al. | |
| 2022/0360943 A1 | 11/2022 | Edge et al. | |
| 2023/0189170 A1* | 6/2023 | Kim ..................... | H04W 4/021 370/350 |

FOREIGN PATENT DOCUMENTS

| | | |
|---|---|---|
| CN | 114501423 | 5/2022 |
| EP | 3890208 | 10/2021 |
| TW | 202110261 | 3/2021 |

OTHER PUBLICATIONS

Kan Wang et al., "LEO satellite clock analysis and prediction for positioning applications," Geo-Spatial Information Science, vol. 25, Jun. 2021, pp. 1-21.

(Continued)

*Primary Examiner* — Kyaw Z Soe
(74) *Attorney, Agent, or Firm* — JCIPRNET (57) ABSTRACT

A communication system includes a distributed unit (DU). The DU estimates distance information, converts the distance information into a transit time difference, and adjusts a transmission window according to the transit time difference, in which start and end points of the transmission window move according to the transit time difference.

20 Claims, 11 Drawing Sheets

(56) References Cited

OTHER PUBLICATIONS

Federica Rinaldi et al., "Non-Terrestrial Networks in 5G & Beyond: A Survey," IEEE Access, vol. 8, Sep. 2020, pp. 165178-165200.

Wei Wang et al., "High Precision Time Synchronization of LEO Constellation Based on PPP," China Satellite Navigation Conference (CSNC 2021) Proceedings, Jun. 2021, pp. 53-61.

M. Mahdi Azari et al., "Evolution of Non-Terrestrial Networks From 5G to 6G: A Survey," IEEE Communications Surveys & Tutorials, Aug. 2022, pp. 1-41.

Stanisław Hanasz et al., "Concept of an Enhanced Accuracy Onboard Time Synchronization via Communication Link," 2020 IEEE Aerospace Conference, Mar. 2020, pp. 1-6.

Han Jiren et al., "General Introduction of Non-Terrestrial Networks for New Radio," ZTE Communications, vol. 20, Jan. 2022, pp. 72-78.

"Office Action of Taiwan Counterpart Application", issued on Jun. 27, 2023, p. 1-p. 6.

\* cited by examiner

COMMUNICATION SYSTEM AND COMMUNICATION METHOD

CROSS-REFERENCE TO RELATED APPLICATION

This application claims the priority benefit of Taiwan application serial no. 111145822, filed on Nov. 30, 2022. The entirety of the above-mentioned patent application is hereby incorporated by reference herein and made a part of this specification.

TECHNICAL FIELD

The disclosure relates to a communication technology, and in particular, to a communication system and a communication method.

BACKGROUND

In the non-terrestrial network (NTN), the fifth-generation mobile communication (5G) network provides satellite network by linking the network with the base station loaded on the satellite (gNB) through the NTN gateway router (NTN Gateway) of the ground station. The NTN may be divided into a transparent payload satellite and a regenerative payload satellite. The difference is that the main purpose of the transparent payload satellite is to enhance the signal energy, while the regenerative payload satellite may decode and demodulate the signal, and re-encode and modulate it before transmitting to the target.

The regenerative payload satellite may perform the regenerative function of the signal from the earth, so the satellite contains some or all of the functions of the base station. In the Open Radio Access Network (ORAN) specification, the radio unit (RU) of the base station and the distributed unit (DU) of the base station are transmitted through the fronthaul interface, and in order to ensure that the RU may process the corresponding packet at the correct time point, the packet transmission window of the DU needs to consider the transmission delay of the RU and the fronthaul interface at the same time. However, since the distance between the NTN gateway router and the satellite changes with the operation of the satellite, the transmission delay of the feeder link also changes accordingly, causing the fronthaul interface between the RU and the DU to be quite sensitive to delay.

SUMMARY

In view of this, the embodiments of the disclosure provide a communication system and a communication method, which may improve the problem of buffer overflow at the receiving terminal caused by the transmission delay and the jitter, and maintain the service continuity of the network system through adjusting the packet transmission window.

An embodiment of the disclosure provides a communication system, including a distributed unit, which estimates distance information, converts the distance information into a transit time difference, and adjusts a transmission window according to the transit time difference, in which start and end points of the transmission window move according to the transit time difference.

An embodiment of the disclosure provides a communication method, applicable to a communication system, and including the following. Distance information is estimated. The distance information is converted into a transit time difference. A transmission window is adjusted according to the transit time difference, in which start and end points of the transmission window move according to the transit time difference.

Based on the above, according to the communication system and the communication method of the embodiments of the disclosure, the DU may estimate the distance information, convert the distance information into the transit time difference, and dynamically adjust the transmission window of the DU. In this way, the embodiment of the disclosure allows the fronthaul interface packet to arrive within the packet receiving window of the RU, thereby solving the problem of buffer overflow of the RU caused by the transmission delay and the jitter between the satellite and the NTN gateway, and avoiding packet loss that may cause the user equipment NR-Uu link to be broken. When the gateway needs to be moved due to damage, the embodiment of the disclosure only needs to dynamically adjust the packet transmission window of the DU to ensure the service continuity and stability of the wireless network system, which is suitable for use in scenarios where emergency rescue communications are provided.

DESCRIPTION OF THE EMBODIMENTS

Parts of the embodiments of the disclosure will be described in details below with reference to the accompanying drawings. For the reference numerals used in the following description, the same reference numerals appearing in different drawings will be regarded as the same or similar components. These embodiments are only a part of the disclosure, and do not disclose all possible implementation modes of the disclosure. Rather, these embodiments are only examples of the patentable scope of the disclosure. Where possible, elements/components/steps using the same reference numerals in the drawings and embodiments represent the same or similar parts. Elements/components/steps using the same reference numerals or the same terms in different embodiments may serve as reference for each other.

Figure 1:
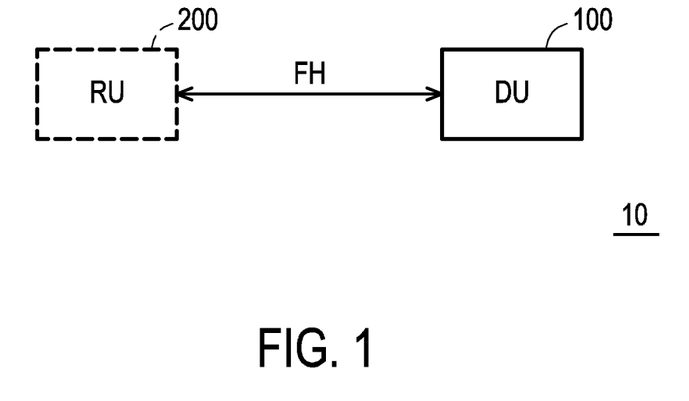
FIG. 1 is a schematic diagram of a communication system according to an embodiment of the disclosure.

FIG. 1 is a schematic diagram of a communication system according to an embodiment of the disclosure. A communication system 10 includes a distributed unit (DU) 100. The distributed unit may transmit a packet through a fronthaul interface FH. In an embodiment, the communication system 10 includes the DU 100 and a radio unit (RU) 200. The DU 100 and the RU 200 may be communicatively connected through the fronthaul interface FH. Specifically, the DU 100 may be disposed at a mobile communication node. For example, the DU 100 may be a distributed unit of a ground-based base station (gNB). The term "base station" (BS) in the embodiment of the disclosure may be, for example, synonymous with a variant or a sub-variant of a "gNodeB" (a gNB), an "eNodeB" (an eNB), a node B, an advanced BS (an ABS), a transmission reception point (a TRP), an unlicensed TRP, a base transceiver system (a BTS), an access point, a home BS, a relay station, a scatterer, a repeater, an intermediate node, an intermediary, a satellite-based communication base station, etc. The RU 200 may be a radio unit disposed at a satellite. The satellite may be, for example, a regenerative payload satellite containing some or all of the functions of the base station.

Figure 2:
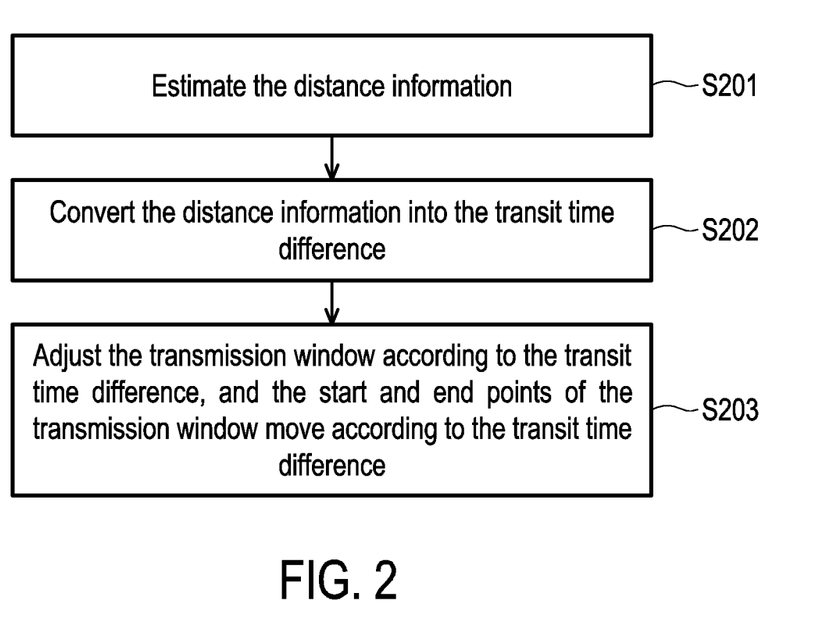
FIG. 2 is a flow diagram of a communication method according to an embodiment of the disclosure.

FIG. 2 is a flow diagram of a communication method according to an embodiment of the disclosure. The method shown in FIG. 2 is applicable to the communication system 10 of FIG. 1. In step S201, the DU 100 estimates distance information. In step S202, the DU 100 converts the distance information into the transit time difference. In step S203, the DU 100 adjusts the transmission window according to the transit time difference. The start and end points of the transmission window move according to the transit time difference.

Figure 3:
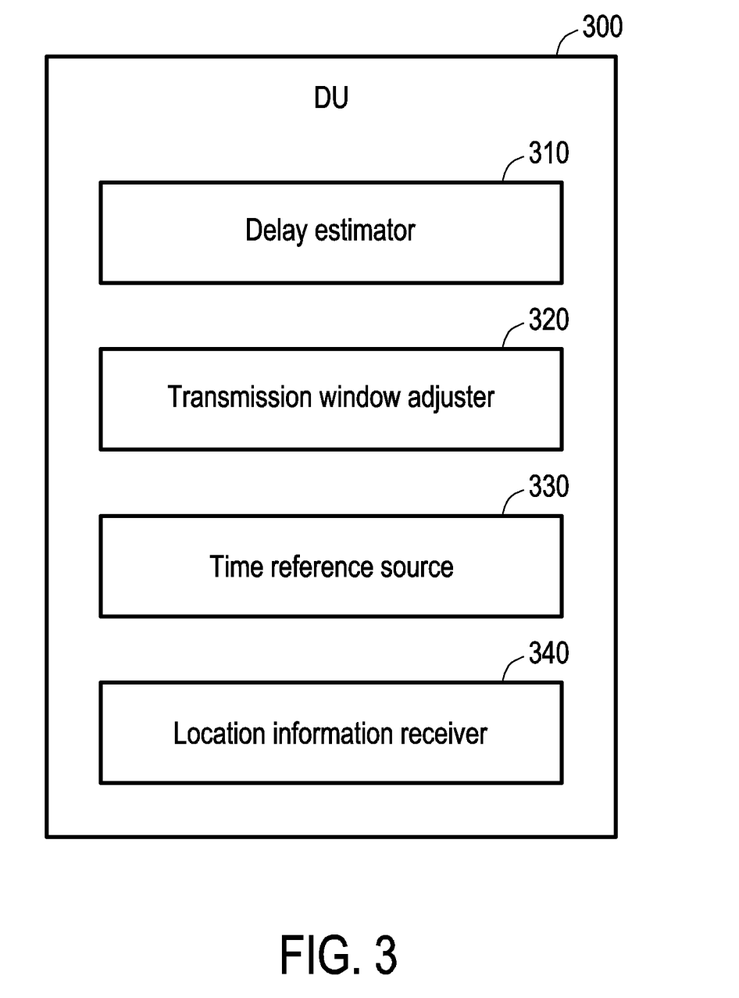
FIG. 3 is a block diagram of a distributed unit according to an embodiment of the disclosure.

FIG. 3 is a block diagram of a distributed unit according to an embodiment of the disclosure. In an embodiment, a DU 300 may include a delay estimator 310, a transmission window adjuster 320, a time reference source 330, and a location information receiver 340. Specifically, the DU 300 may be disposed at a mobile communication node. For example, the DU 300 may be a distributed unit of a ground-based base station (gNB). In an embodiment, the delay estimator 310 may be used to estimate the distance information and convert the distance information into the transit time difference. In an embodiment, the transmission window adjuster 320 may be used to adjust the transmission window according to the transit time difference. The start and end points of the transmission window move according to the transit time difference. In an embodiment, a time reference source 330 may be used to provide timing for the DU 300. In an embodiment, the location information receiver 340 may be used to determine the location information of the radio unit of the communication connection from the received signal.

According to different design requirements, each block of the DU 300 (the delay estimator 310, the transmission window adjuster 320, the time reference source 330, and the location information receiver 340) may be implemented by hardware, firmware, software (that is, a program), or a combination of more than one of the above three.

In terms of hardware, the aforementioned blocks of the delay estimator 310, the transmission window adjuster 320, the time reference source 330, and the location information receiver 340 may be implemented as logic circuits on an integrated circuit. The relevant functions of the delay estimator 310, the transmission window adjuster 320, the time reference source 330, and the location information receiver 340 may be implemented as hardware by using hardware description languages (such as Verilog HDL or VHDL) or other suitable programming languages. For example, the relevant functions of the above-mentioned delay estimator 310, transmission window adjuster 320, time reference source 330, and location information receiver 340 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the relevant functions of the delay estimator 310, the transmission window adjuster 320, the time reference source 330, and the location information receiver 340 may be implemented as programming codes. For example, the delay estimator 310, the transmission window adjuster 320, the time reference source 330, and the location information receiver 340 are implemented by using general programming languages (such as C, C++, or assembly language) or other suitable programming languages. The programming code may be recorded/stored in a recording medium. In some embodiments, the recording medium includes, for example, a read only memory (ROM), a storage device, and (or) a random access memory (RAM). In some other embodiments, the recording medium may include a "non-transitory computer readable medium". For example, a tape, a disk, a card, a semiconductor memory, a programmable logic circuit, etc., may be used to implement the non-transitory computer readable medium. A computer, a central processing unit (CPU), a controller, a microcontroller, or a microprocessor may read and execute the programming code from the recording medium, thereby implementing the relevant functions of the above-mentioned delay estimator 310, transmission window adjuster 320, time reference source 330, and location information receiver 340. Furthermore, the programming code may be provided to the computer (or the CPU) via any transmission medium (a communication network or a broadcast wave, etc.).

Figure 4:
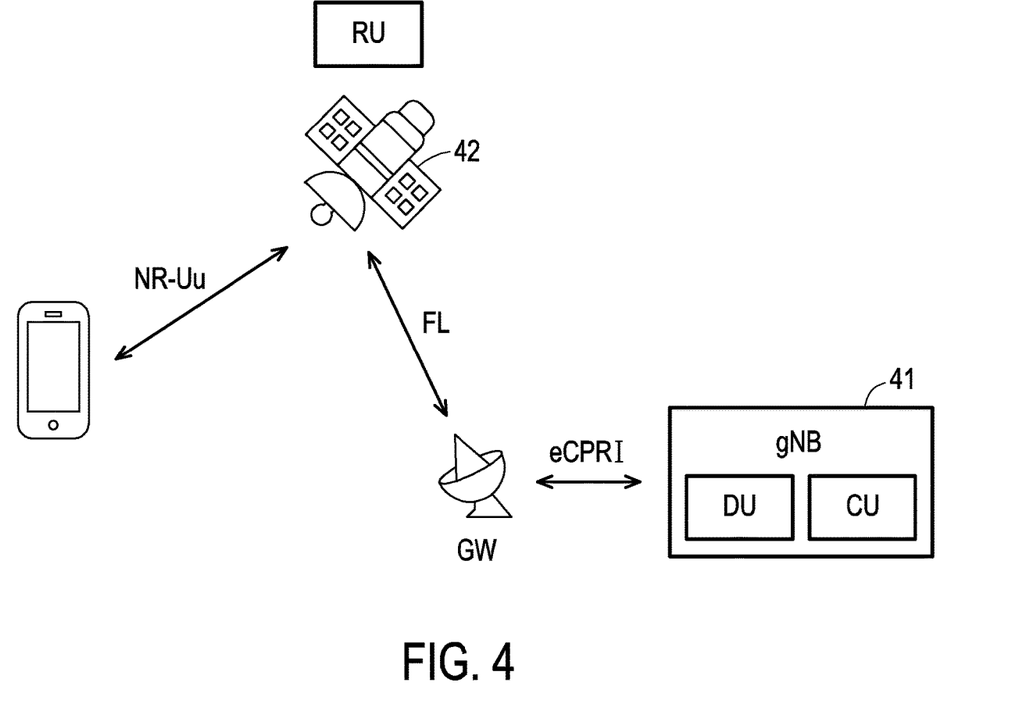
FIG. 4 is a schematic diagram of a communication between a satellite and a ground station according to an embodiment of the disclosure.

FIG. 4 is a schematic diagram of a communication between a satellite and a ground station according to an embodiment of the disclosure. A distributed unit DU is disposed at a ground station 41. The ground station 41 may be a gNB node including the distributed unit DU and a centralized unit (CU). A radio unit RU is disposed at a satellite 42. The satellite 42 may be a regenerative payload satellite with an RU on board. The DU and the CU located at the ground station 41 may transmit via a feeder link FL between a gateway GW and the satellite 42. Specifically, the ground station 41 may be connected to the gateway GW through the eCPRI interface, and the packet is then transmitted to the satellite 42 through the feeder link FL.

It should be noted that, in satellite communication, the distance between the DU and the RU varies with the orbit of the satellite 42. As the satellite 42 moves, the RU of the satellite 42 needs to increase the buffer zone thereof to avoid signal interruption due to the increased packet transmission delay of the fronthaul interface. In some application scenarios, when the orbit of the satellite 42 or the gateway GW changes, it may not be possible to dynamically increase the buffer zone of the RU of the satellite 42 in real time. At this time, the transmission delay and the jitter between the satellite 42 and the gateway GW may cause the RU of the satellite 42 to fail to maintain the NR-Uu connection with the user equipment 43 normally.

Figure 5:
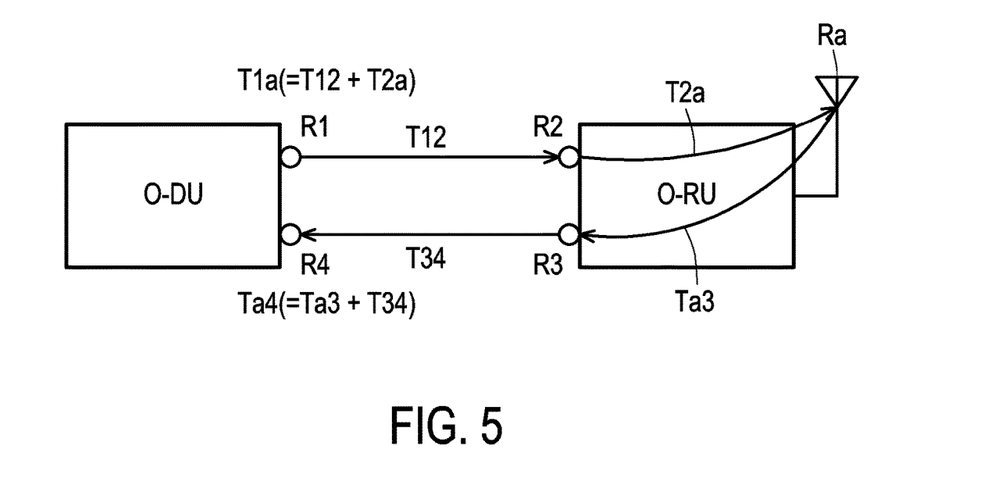
FIG. 5 is a schematic diagram of a fronthaul interface according to an embodiment of the disclosure.

FIG. 5 is a schematic diagram of a fronthaul interface according to an embodiment of the disclosure. In the open radio access network (ORAN) specification, an O-RU and an O-DU are transmitted through the fronthaul interface. The O-RU is a radio unit of the ORAN specification. The O-DU is a distributed unit of the ORAN specification. In FIG. 5, the path from a signal terminal R1 to a signal terminal R2 is the downlink, and the path from a signal terminal R3 to a signal terminal R4 is the uplink. A downlink transmission delay between the O-DU and the O-RU is denoted by T12. An uplink transmission delay between the O-DU and the O-RU is denoted by T34. In non-terrestrial communication systems, the transmission delay T12 may include a fronthaul interface transmission delay, an NTN gateway router jitter, and a satellite router processing time. These delay times are not constant, so the packet transmission between the O-DU and the O-RU will regulate the transmission window (or the packet transmission window) and the receiving window (or the packet receiving window) according to the range of the upper and lower limits of the transmission delay.

In the downlink, a time T1$a$ represents the time required after the packet is sent out from the O-DU until being processed at a signal terminal Ra of the O-RU. A time T2$a$ represents the processing time inside the O-RU from the signal terminal R2 to the signal terminal Ra. The time Tia may represent a downlink delay time, and the time Tia includes the transmission delay T12 plus the time T2$a$.

In the uplink, a time Ta4 represents the time required after the packet is being processed and transmitted from the signal terminal Ra of the O-RU until reaching the signal terminal R4 of the O-DU. A time Ta3 represents the processing time inside the O-RU from the signal terminal Ra to the signal terminal R3. The time Ta4 may represent an uplink delay time, and the time Ta4 includes a time T34 plus a transmission delay Ta3.

Figure 6:
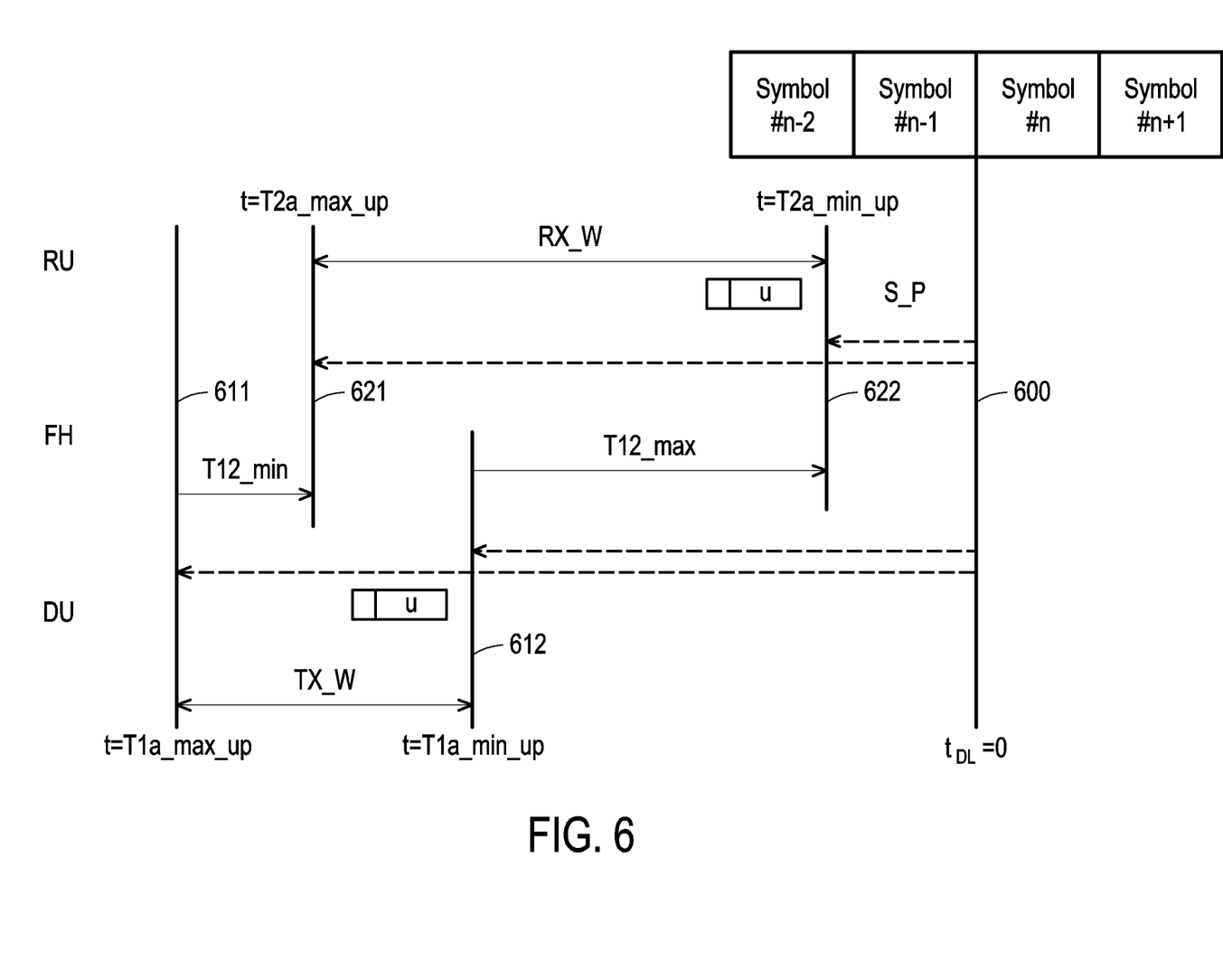
FIG. 6 is a schematic diagram of a packet transmission between a distributed unit and a radio unit in an embodiment of the disclosure.

FIG. 6 is a schematic diagram of a packet transmission between a distributed unit and a radio unit in an embodiment of the disclosure. Straight lines 611, 612, 621, 622, and 600 represent multiple time points during the transmission of the packet from DU to RU. In FIG. 6, the direction from left to right represents the order of time, that is, the straight lines 611, 621, 612, 622, and 600 sequentially represent the multiple time points in the packet transmission process from left to right. A time point tDL represented by the straight line 600 is the time point when the RU completes a symbol processing S_P of the received packet and transmits the corresponding wireless signal. The straight line 611 corresponds to the start point of a packet transmission window TX_W of the DU. The straight line 612 corresponds to the end point of the packet transmission window TX_W of the DU. The straight line 621 corresponds to the start point of a packet receiving window RX_W of the RU. The straight line 622 corresponds to the end point of a packet transmission window RX_W of the RU.

In the downlink transmission, in order to ensure that the RU may transmit the corresponding wireless signal at the correct frame boundary (such as the boundary of Symbol #n−2, Symbol #n−1, Symbol #n, and Symbol #n+1), in the embodiment of the disclosure, the packet transmission window TX_W of the DU and the packet receiving window RX_W of the RU are designed taking into account the signal processing time T2$a$ inside the RU and the change of the transmission delay T12 of the fronthaul interface, and the start and end points of the transmission window TX_W are adjusted according to the transit time difference. Specifically, when the distance information estimated by the DU changes, the signal processing time T2$a$ inside the RU and the transmission delay T12 of the fronthaul interface may also change accordingly, and the start and end points of the packet transmission window TX_W must take into account the downlink delay time Tia to move accordingly. For example, a time t=T1$a$_max_up corresponding to the straight line 611 is the maximum value of the delay time T1$a$, and a time t=T1$a$_min_up corresponding to the straight line 612 is the minimum value of the delay time T1$a$. A packet u is sent through the DU and arrives at the RU through the fronthaul interface FH. The minimum delay time that may be generated by the transmission delay T12 of the fronthaul interface is T12_min. The maximum delay time that may be generated by the transmission delay T12 of the fronthaul interface is T12_max.

It should be noted that the packet transmitted at the start point of the packet transmission window TX_W should reach the start point of the packet receiving window RX_W corresponding to the straight line 621 at the earliest after the minimum delay time T12_min. On the other hand, the packet transmitted at the end point of the packet transmission window TX_W should reach the end point of the packet receiving window RX_W corresponding to the straight line 622 at the latest after the maximum delay time T12_max. At the same time, considering the change of the signal processing time T2$a$ inside the RU, a corresponding time t=T2$a$_max_up of the start point of the packet receiving window RX_W is the maximum value of the signal processing time T2$a$, and a corresponding time t=T2$a$_min_up of the end point of the packet receiving window RX_W is the minimum value of the signal processing time T2$a$. In this way, it may be ensured that the packet u is not lost when it arrives at the RU.

Figure 7:
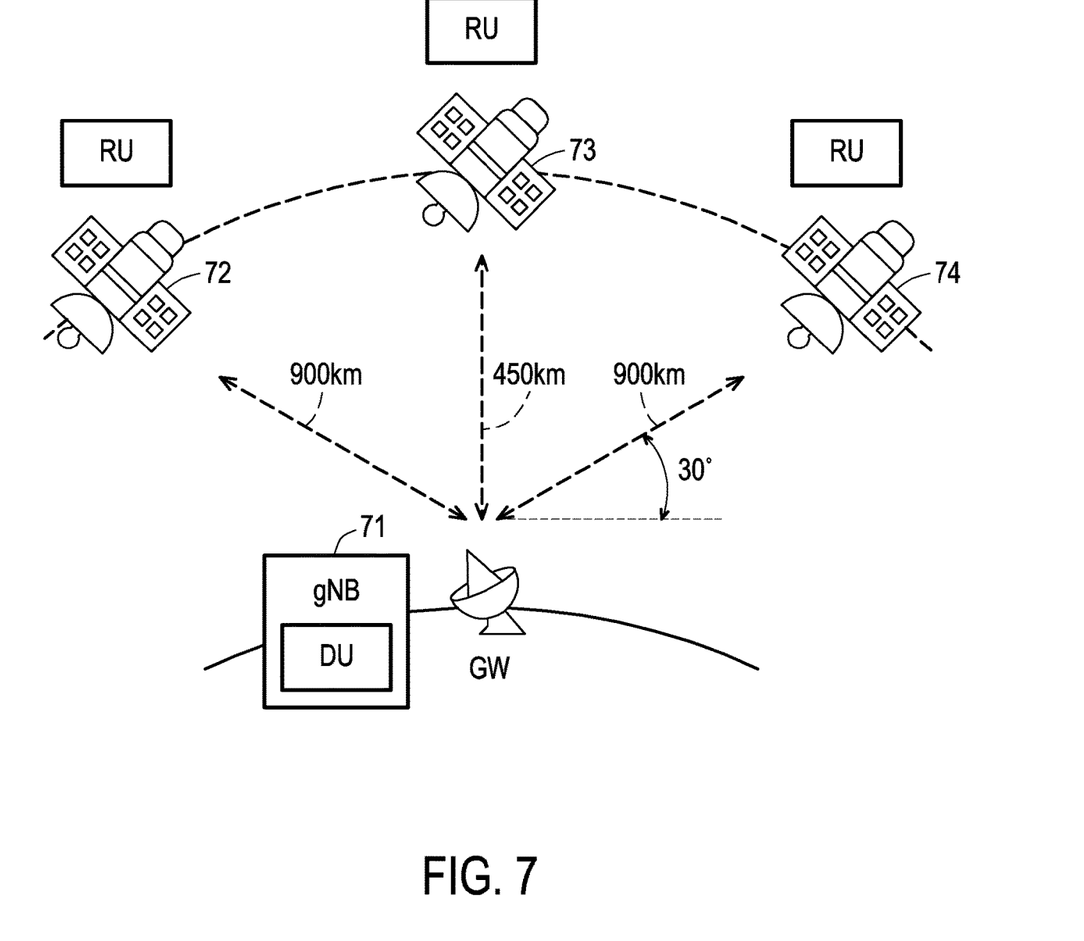
FIG. 7 is a schematic diagram of a distributed unit estimating distance information according to an embodiment of the disclosure.

FIG. 7 is a schematic diagram of a distributed unit estimating distance information according to an embodiment of the disclosure. Referring to FIG. 7, a gNB 71 located on the ground includes the DU. The satellites 72, 73, and 74 correspond to different time point locations on the orbit. The DU may exchange messages through the feeder link between the NTN gateway GW and the RU disposed at the satellites 72, 73, and 74 according to the fronthaul interface formulated by the ORAN. In an embodiment, the flying altitude of the satellites 72, 73, and 74 is "450 km". It should be noted that in FIG. 7, the distance information between the RU and the DU vary with the satellites 72, 73, and 74 at different locations. For example, the satellites 72 and 74 are located at the elevation angle of 30 degrees of the gateway GW, and the distance between the satellites 72 and 74 and the gateway GW is "900 km". The satellite 73 is running directly above the gateway GW, and the distance between the satellite 73 and the gateway GW is "450 km".

In an embodiment, the DU may estimate the distance information through the orbit of the satellite provided by the NTN network controller, and calculate the corresponding feeder link delays of the satellites 72, 73, and 74 at each time point according to the distance information.

The link transmission delay Delay$_{feeder\_link}$ may be calculated by the following formula (1):

$$\text{Delay}_{feeder\_link} = \frac{D_{feeder_{link}}}{c} \quad \text{formula (1)}$$

In the above formula (1), $D_{feeder\_link}$ represents the distance between the satellite and the gateway GW, and the constant c is the speed of light.

Specifically, in FIG. 7, the distance information $D_{feeder\_link}$=900 km of the satellites 72 and 74 is used to calculate the feeder link delay Delay$_{feeder\_link}$=3 ms. The distance information of the satellite 73 $D_{feeder\_link}$=450 km is used to calculate the feeder link delay Delay$_{feeder\_link}$=1.5 ms.

In an embodiment, the DU may use the calculated feeder link delay Delay$_{feeder\_link}$ as the transit time difference, and adjust the transmission window TX_W according to the transit time difference. The DU adds the time difference to the start and end points of the transmission window TX_W to shift the transmission window TX_W.

Figure 8:
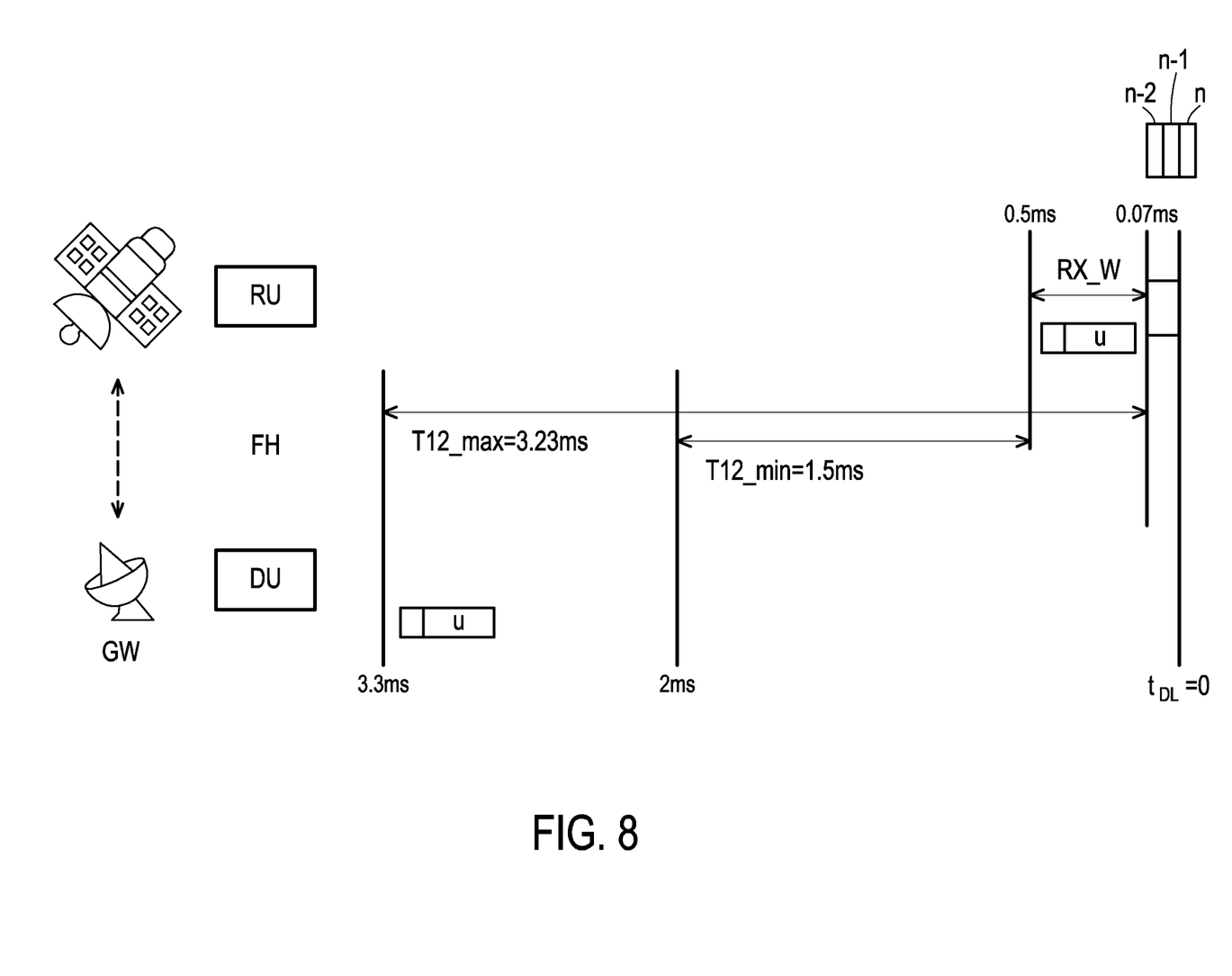
FIG. 8 is a schematic diagram of a packet transmission between a distributed unit and a radio unit according to an embodiment of the disclosure.

FIG. 8 is a schematic diagram of a packet transmission between a distributed unit and a radio unit according to an embodiment of the disclosure. In an embodiment, the shortest signal processing time of a single RU bit is 0.07 ms, and the router jitter and the satellite router processing time of the NTN gateway GW fall within the range of 0 ms to 0.23 ms. At this time, the values of the various delay times of the fronthaul interface FH between the DU and the RU are shown in Table 1 below.

TABLE 1

| Delay time | milliseconds (ms) |
|---|---|
| T2a_min_up | 0.07 |
| T2a_max_up | 0.5 |
| T12_min | 1.5 |
| T12_max | 3.23 |
| T1a_min_up | 2 |
| T1a_max_up | 3.3 |

The delay time T2a_min_up is related to the symbol processing time of the RU. The delay time T2a_max_up is related to the buffer zone size of the RU. For example, when the subcarrier spacing (SCS) is 30 KHz, the receiving buffer zone size on the RU is 1 slot, and T2a_max_up=0.5 ms at this time.

It should be noted that the estimated value of the transmission delay T12 may fall within the range of T12_min and T12_max according to the orbit change of the satellite (for example, the satellites 72, 73, 74 shown in FIG. 7). The start and end points of the packet transmission window TX_W also need the T12 to change. In the embodiment of the disclosure, the link transmission delay Delay$_{feeder\_link}$ calculated by the DU estimated distance information may be used to adjust the start and end points of the packet transmission window TX_W, so that the packet may fall within the packet receiving window RX_W to avoid packet loss.

Specifically, when the distributed unit DU has calculated the link transmission delay Delay$_{feeder\_link}$, the start and end points of the packet transmission window TX_W may be adjusted according to the following formula (2) and formula (3):

$$T1a\_max\_up = Delay_{feeder\_link} + T2a\_max\_up \quad \text{formula (2)}$$

$$T1a\_min\_up = Delay_{feeder\_link} + T2a\_min\_up + 0.23 \quad \text{formula (3)}$$

Figure 9:
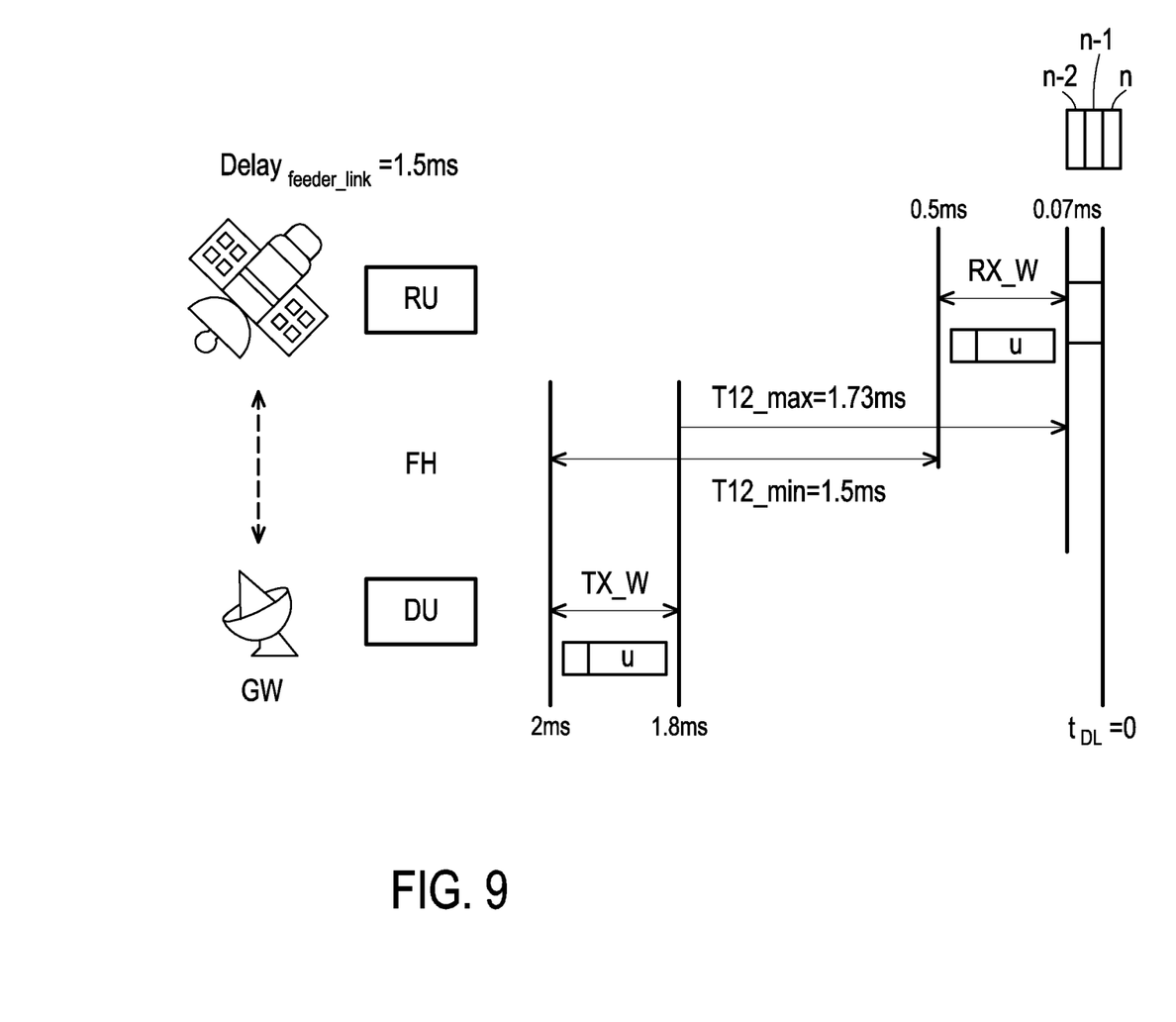
FIG. 9 is a schematic diagram of a distributed unit adjusting a transmission window according to an embodiment of the disclosure.

FIG. 9 is a schematic diagram of a distributed unit adjusting a transmission window according to an embodiment of the disclosure. Take the link transmission delay Delay$_{feeder\_link}$=1.5 as an example, which corresponds to the satellite 73 shown in FIG. 7. In the embodiment, same as in FIG. 8, the shortest signal processing time of a single RU bit is 0.07 ms, and the router jitter and the satellite router processing time of the NTN gateway GW fall within the range of 0 ms to 0.23 ms. At this time, the values of the various delay times of the fronthaul interface FH between the DU and the RU are shown in Table 2 below.

TABLE 2

| Delay time | milliseconds (ms) |
|---|---|
| T2a_min_up | 0.07 |
| T2a_max_up | 0.5 |
| T12_min | 0 |
| T12_max | 0.23 |
| T1a_min_up | 0.3 |
| T1a_max_up | 0.5 |

According to the calculation results of formula (2) and formula (3), the start and end points of the mobile packet transmission window of the distributed unit DU are as follows:

$$T1a\_max\_up = 1.5 + 0.5 = 2 \text{ ms}$$

$$T1a\_min\_up = 1.5 + 0.07 + 0.23 = 1.8 \text{ ms}$$

Figure 10:
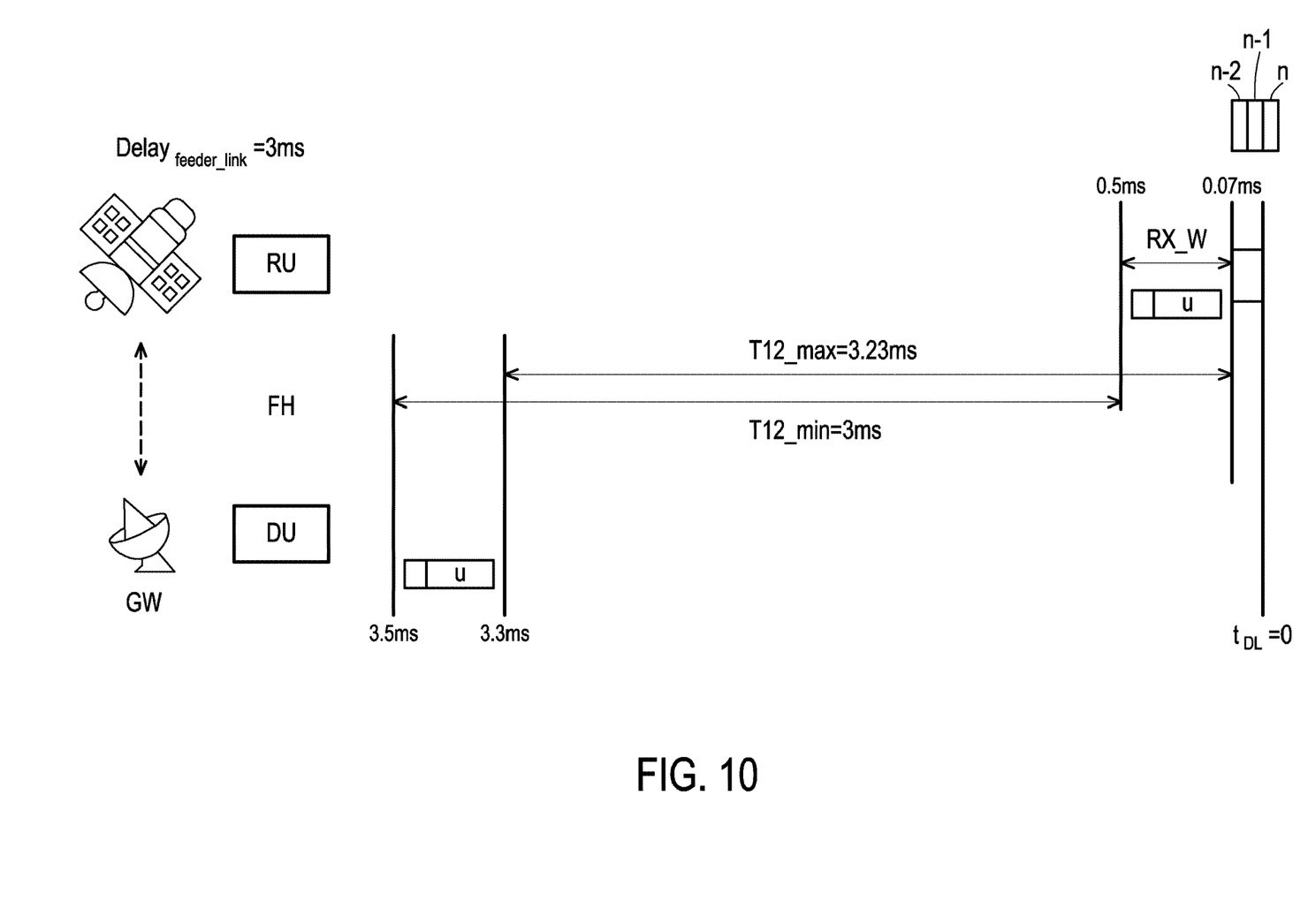
FIG. 10 is a schematic diagram of a distributed unit adjusting a transmission window according to an embodiment of the disclosure.

FIG. 10 is a schematic diagram of a distributed unit adjusting a transmission window according to an embodiment of the disclosure. Take the link transmission delay Delay$_{feeder\_link}$=3.0 ms as an example, which corresponds to the satellites 72 and 74 shown in FIG. 7. In the embodiment, same as in FIG. 8, the shortest signal processing (or the symbol processing S_P) time of a single RU bit is 0.07 ms, and the router jitter and the satellite router processing time of the NTN gateway GW fall within the range of 0ms to 0.23 ms. At this time, the values of the various delay times of the fronthaul interface FH between the DU and the RU are shown in Table 3 below.

TABLE 3

| Delay time | milliseconds (ms) |
|---|---|
| T2a_min_up | 0.07 |
| T2a_max_up | 0.5 |
| T12_min | 3 |
| T12_max | 3.23 |
| T1a_min_up | 3.3 |
| T1a_max_up | 3.5 |

According to the calculation results of formula (2) and formula (3), the start and end points of the mobile packet transmission window of the distributed unit DU are as follows:

$$T1a\_max\_up = 3.0 + 0.5 = 3.5 \text{ ms}$$

$$T1a\_min\_up = 3.0 + 0.07 + 0.23 = 3.3 \text{ ms}$$

Based on the above-mentioned embodiments of FIG. 8, FIG. 9, and FIG. 10, the distance information estimated by the DU of the embodiment of the disclosure calculates different feeder link transmission delays Delay$_{feeder\_link}$ to serve as the transit time difference, and adjusts the transmission time of the packet transmission window TX_W according to the transit time difference. In this way, it may be ensured that the packet arrives at the packet receiving window RX_W of the RU at the corresponding time, thereby avoiding packet loss.

Figure 11:
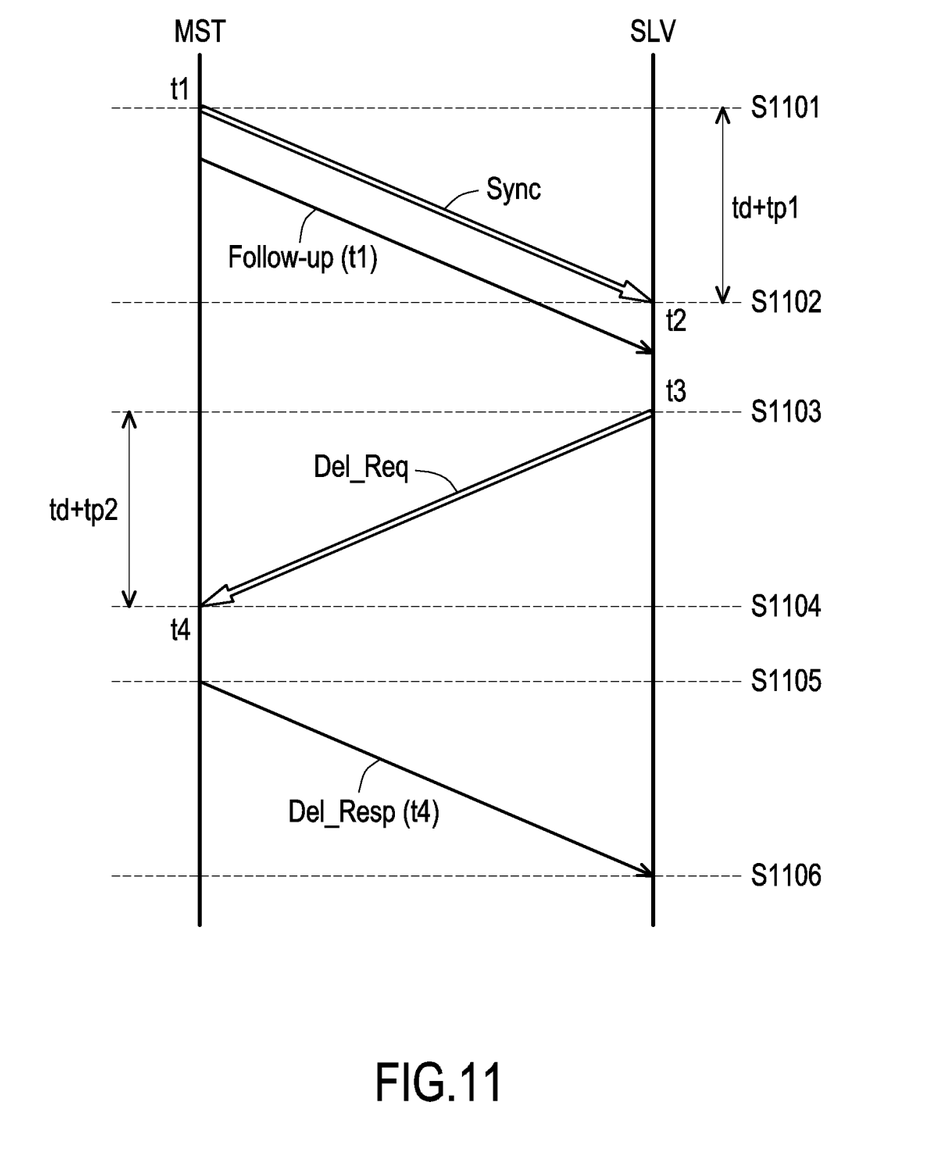
FIG. 11 is a signaling diagram of a message exchange procedure for executing a precision time protocol (PTP) between a distributed unit and a radio unit according to an embodiment of the disclosure.

FIG. 11 is a signaling diagram of a message exchange procedure for executing a precision time protocol (PTP) between a distributed unit and a radio unit according to an embodiment of the disclosure. Referring to FIG. 11, the message exchange procedure of the PTP includes the mutual communication between a master terminal MST and a slave terminal SLY. The master terminal MST is, for example, a radio unit RU. The slave terminal SLY is, for example, a distributed unit DU. In an embodiment of the disclosure, the time synchronization is performed between the distributed unit DU and the radio unit RU through the message exchange procedure of the PTP.

In step S1101, at a time point t1, the master terminal MST sends synchronization information Sync to the slave terminal SLY. The time point t1 is the timestamp when the synchronization information Sync leaves the master terminal MST. Optionally, step S1101 may adopt a one-step method, and at this time, the synchronization information Sync includes a time stamp t1. Optionally, step S1101 may adopt a two-step method, and at this time, after the master terminal MST sends the synchronization information Sync, the master terminal MST further sends follow-up information Follow-up (t1) to the slave terminal SLY. The follow-up information Follow-up (t1) includes a timestamp t1.

In step S1102, at a time point t2, the slave terminal SLY receives the synchronization information Sync. The difference between a timestamp t2 and the timestamp t1 includes a time difference td plus a wireless transmission delay tp1.

In step S1103, at a time point t3, the slave terminal SLY sends delay request information Del_Req to the master terminal MST. Specifically, a timestamp t3 is the timestamp when the synchronization information Sync leaves the master terminal MST. In an embodiment, the delay request information Del_Req may include the timestamp t3. In an embodiment, the master terminal MST does not necessarily need the timestamp t3, and at this time, the delay request information Del_Req does not carry information about the timestamp t3.

In step S1104, at a time point t4, the master terminal MST receives the delay request information Del_Req. The difference between a timestamp t4 and the timestamp t3 includes the time difference td plus a wireless transmission delay tp2.

In step S1105, the master terminal MST replies a delay request response information Del_Resp(t4). The delay request response information Del_Resp(t4) includes the timestamp t4.

In step S1106, the slave terminal SLY calculates the link delay according to the timestamps t1, t2, t3, t4. In an embodiment, in the message exchange procedure of PTP, the distributed unit DU calculates the wireless transmission delay according to the multiple timestamps, and compensates the wireless transmission delay in the average link delay equation to determine the transit time difference.

In detail, the wireless transmission delays tp1 and tp2 vary with the distance, and may be obtained from the satellite broadcast or the accurate ephemeris, the delay, or the distance estimation of the feeder link provided by the network server at the corresponding time.

In an embodiment, the wireless transmission delays tp1 and tp2 may be calculated according to the following formula (4) and formula (5) and added to the average link delay MeanPathDelay equation to calculate a compensation transmission delay Offset(t1):

$$\text{MeanPathDelay} = ((t2-t1)+(t4-t3))/2 \quad \text{formula (4)}$$

$$\text{Offset}(t1) = t2-t1-[\text{MeanPathDelay}-(tp1+tp2)/2] \quad \text{formula (5)}$$

In an embodiment, the compensation transmission delay Offset(t1) may be corrected through the original correction field of the PTP. In an embodiment, a new field may be added in the PTP packet to update the delay.

Figure 12:
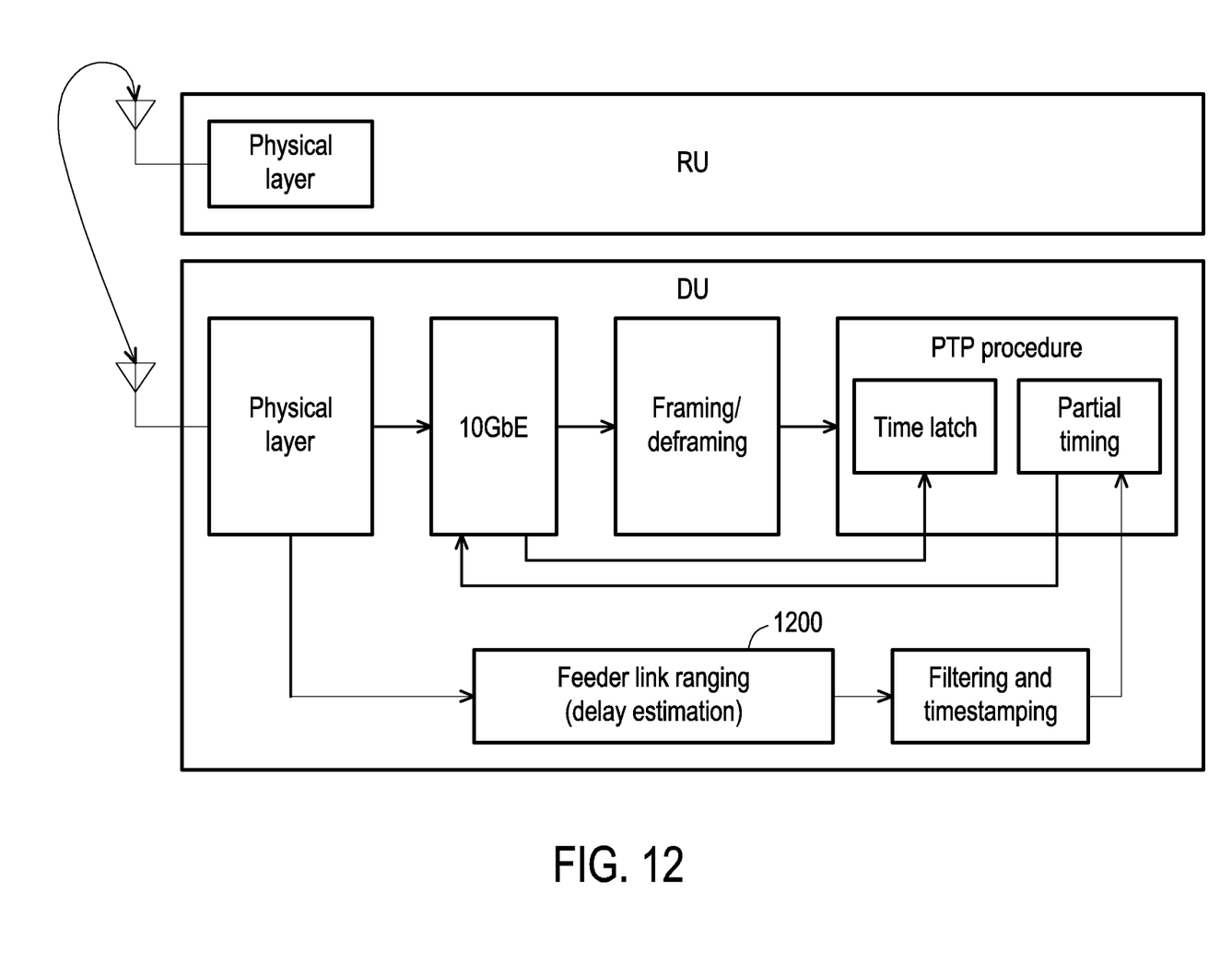
FIG. 12 is a structure diagram of a communication system according to an embodiment of the disclosure.

FIG. 12 is a structure diagram of a communication system according to an embodiment of the disclosure. In an embodiment of the disclosure, the transit time difference includes the delay time estimated by a native feeder link ranging function between the distributed unit DU and the radio unit RU. Referring to FIG. 12, the physical layer of the radio unit RU communicates with the physical layer of the distributed unit DU. The distributed unit DU includes a feeder link ranging (delay estimation) 1200 function block coupled to the physical layer. The feeder link ranging (delay estimation) 1200 function block provides the native ranging function of the distributed unit DU, which may be used to estimate the delay time. Specifically, the native feeder link ranging function may estimate the delay time from the signal processings of the physical layers of the distributed unit DU and the radio unit RU. In an embodiment, the distributed unit DU may add the corresponding timestamp to the estimated delay time. In an embodiment, the distributed unit DU may add the estimated delay time into the PTP procedure to compensate for the expected delay variation and maintain the timing synchronization.

Figure 13:
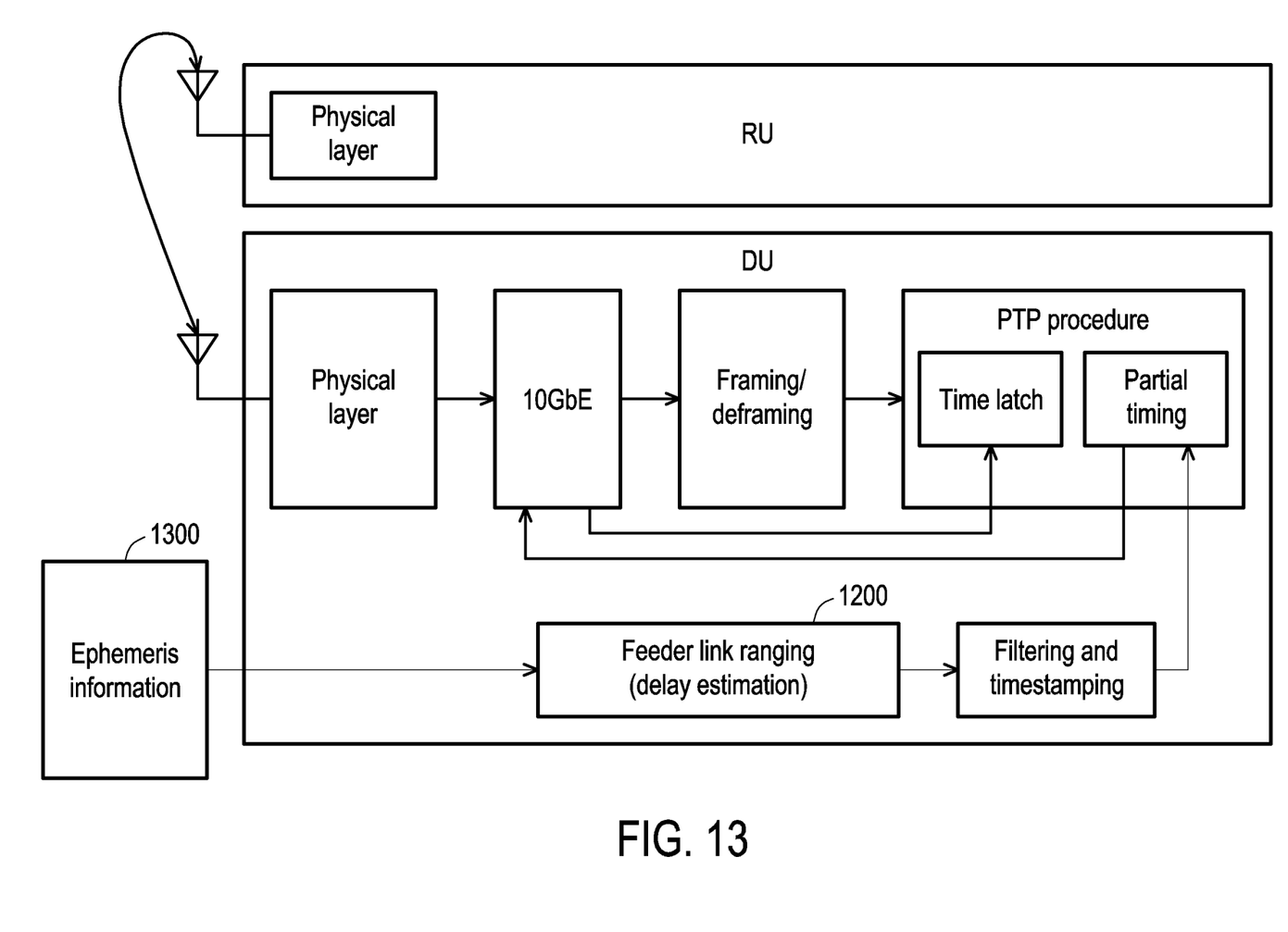
FIG. 13 is a structure diagram of a communication system according to an embodiment of the disclosure.

FIG. 13 is a structure diagram of a communication system according to an embodiment of the disclosure. In an embodiment of the disclosure, the transit time difference includes the delay time predicted from the ephemeris information provided by the satellite broadcast or the network server. Referring to FIG. 13, the distributed unit DU includes the feeder link ranging (delay estimation) 1200 function block. Specifically, the distributed unit DU may utilize ephemeris information 1300 or the time difference received from the satellite broadcast or the network server. The distributed unit DU may predict the delay time according to the ephemeris information 1300 or the time difference. In an embodiment, the distributed unit DU may add the corresponding timestamp to the predicted delay time. In an embodiment, the distributed unit DU may add the predicted delay time into the PTP procedure to compensate for the expected delay variation and maintain the timing synchronization.

To sum up, the embodiment of the disclosure proposes a communication system and communication method. The distributed unit DU located on the ground may dynamically adjust the transit time difference of the feeder link to the packet transmission window of the DU according to the satellite orbit information, so that the fronthaul interface packet may arrive at the RU within the packet receiving window of the RU to solve the problems of packet loss and link interruption caused by the transmission delay and jitter between the satellite and the NTN gateway. When the NTN gateway needs to be moved due to damage, the embodiment of the disclosure only needs to dynamically adjust the packet transmission window of the DU to ensure the continuity and stability of the wireless network system, which is suitable for emergency situations. Furthermore, in another embodiment of the disclosure, the communication system may also include a central unit (CU), a control unit, or a control node. The communication system may substitute the CU, the control unit, or the control node for DU, for executing the communication method in the embodiment of the disclosure.

Although the disclosure has been described with reference to the foregoing embodiments, the embodiments are not intended to limit the disclosure. Any person skilled in the art may make some changes and modifications without departing from the spirit and scope of the disclosure. Therefore, the scope of the disclosure will be defined in the appended claims.

What is claimed is:

1. A communication system comprising a distributed unit, wherein the communication system
estimates distance information,
converts the distance information into a transit time difference,
adjusts a transmission window according to the transit time difference, and start and end points of the transmission window move according to the transit time difference.

2. The communication system according to claim 1, further comprising:
a radio unit, communicatively connected to the distributed unit through a fronthaul interface.

3. The communication system according to claim 2, wherein the radio unit is disposed at a satellite, and the distributed unit is disposed at a ground station.

4. The communication system according to claim 3, wherein the distance information is determined by a feeder link between the distributed unit and the radio unit.

5. The communication system according to claim 3, wherein the distance information comprises orbit information of the satellite.

6. The communication system according to claim 1, wherein the transit time difference comprises a delay time determined by the distributed unit according to a packet measurement result.

7. The communication system according to claim 2, a time synchronization between the distributed unit and the radio unit is performed through a message exchange procedure of a precision time protocol (PTP).

8. The communication system according to claim 7, in the message exchange procedure of the precision time protocol (PTP), the distributed unit calculates a wireless transmission delay according to a plurality of timestamps, and compensates the wireless transmission delay in an average link delay equation to determine the transit time difference.

9. The communication system according to claim 2, wherein the transit time difference comprises a delay time estimated by a native feeder link ranging function between the distributed unit and the radio unit.

10. The communication system according to claim 1, wherein the transit time difference comprises a delay time predicted by a satellite broadcast or ephemeris information provided by a network server.

11. A communication method, applicable to a communication system, wherein the communication method comprises:
estimating distance information;
converting the distance information into a transit time difference; and
adjusting a transmission window according to the transit time difference, wherein start and end points of the transmission window move according to the transit time difference.

12. The communication method according to claim 11, wherein the communication system comprises a distributed unit and a radio unit, and the radio unit is communicatively connected to the distributed unit through a fronthaul interface.

13. The communication method according to claim 12, wherein the radio unit is disposed at a satellite, and the distributed unit is disposed at a ground station.

14. The communication method according to claim 13, wherein the distance information is determined by a feeder link between the distributed unit and the radio unit.

15. The communication method according to claim 13, wherein the distance information comprises orbit information of the satellite.

16. The communication method according to claim 11, wherein the transit time difference comprises a delay time determined by the distributed unit according to a packet measurement result.

17. The communication method according to claim 11, further comprising:
performing a time synchronization through a message exchange procedure of a precision time protocol (PTP).

18. The communication method according to claim 17, further comprising:
calculating a wireless transmission delay according to a plurality of timestamps, and compensating the wireless transmission delay in an average link delay equation to determine the transit time difference in the message exchange procedure of the precision time protocol (PTP).

19. The communication method according to claim 12, wherein the transit time difference comprises a delay time estimated by a native feeder link ranging function between the distributed unit and the radio unit.

20. The communication method according to claim 11, wherein the transit time difference comprises a delay time predicted by a satellite broadcast or ephemeris information provided by a network server.

* * * * *